Dec. 8, 1936. B. W. FREEMAN Re. 20,203

CUT-OUT MACHINE FOR SHOE UPPERS

Original Filed Dec. 3, 1923 7 Sheets-Sheet 1

Dec. 8, 1936. B. W. FREEMAN Re. 20,203

CUT-OUT MACHINE FOR SHOE UPPERS

Original Filed Dec. 3, 1923 7 Sheets-Sheet 2

Inventor

Benjamin W. Freeman

By Riordon and Riordon

Attorneys

Dec. 8, 1936. B. W. FREEMAN Re. 20,203

CUT-OUT MACHINE FOR SHOE UPPERS

Original Filed Dec. 3, 1923 7 Sheets-Sheet 3

Inventor
Benjamin W. Freeman
By Riordon and Riordon
Attorneys

Dec. 8, 1936. B. W. FREEMAN Re. 20,203

CUT-OUT MACHINE FOR SHOE UPPERS

Original Filed Dec. 3, 1923 7 Sheets-Sheet 4

Inventor

Benjamin W. Freeman

By Riordan and Riordan

Attorneys

Dec. 8, 1936. B. W. FREEMAN Re. 20,203

CUT-OUT MACHINE FOR SHOE UPPERS

Original Filed Dec. 3, 1923 7 Sheets-Sheet 5

Inventor
Benjamin W. Freeman
By Riordan and Riordan
Attorneys

CUT-OUT MACHINE FOR SHOE UPPERS
Original Filed Dec. 3, 1923 7 Sheets-Sheet 6
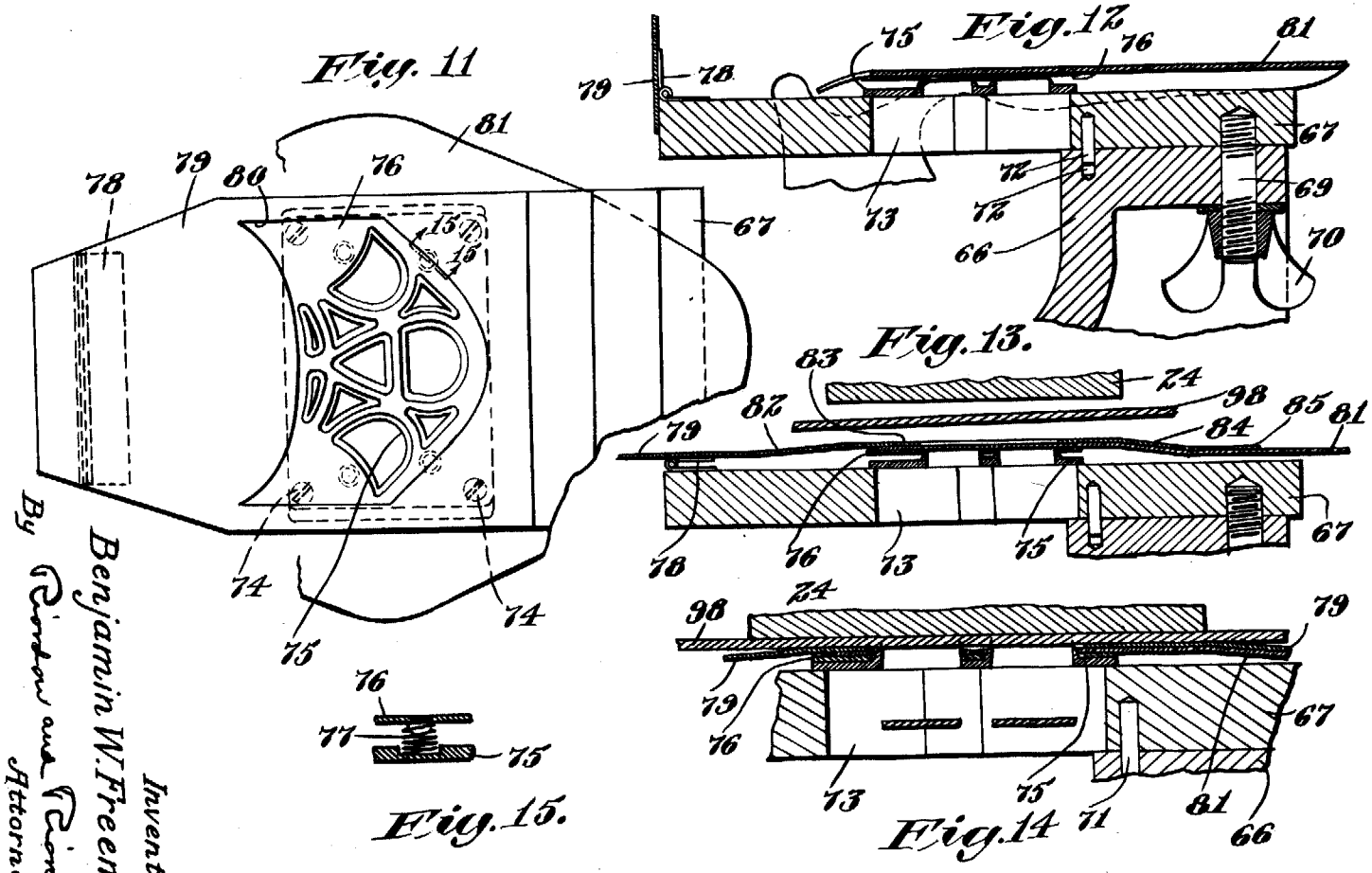
Inventor
Benjamin W. Freeman
By Riordan and Riordan
Attorneys Dec. 8, 1936. B. W. FREEMAN Re. 20,203

CUT-OUT MACHINE FOR SHOE UPPERS

Original Filed Dec. 3, 1923 7 Sheets-Sheet 7

Inventor

Benjamin W. Freeman

By Riordan and Riordan

Attorneys

Reissued Dec. 8, 1936

Re. 20,203

UNITED STATES PATENT OFFICE 20,203

CUT-OUT MACHINE FOR SHOE UPPERS

Benjamin W. Freeman, Cincinnati, Ohio

Division B

Division of original No. 1,681,033, dated August 14, 1928, Serial No. 678,213, December 3, 1923. Application for reissue October 30, 1936, Serial No. 108,480

40 Claims. (Cl. 164—93)

My present invention is a machine for use in the manufacture of boots and shoes, and particularly for forming the openwork or cut out sections in shoe uppers, as well as being utilized for all stamping work, perforating, ornamentation or the like, in connection with press machines.

This reissue application is a division of original Patent No. 1,681,033, granted August 14, 1928.

In presses or machines as heretofore made, it has been possible to operate only upon relatively small portions of flat material, such for example as cutting out toe tips, perforating and ornamenting sections or small portions of shoe uppers or the like, while my present machine is adapted to perform all of these operations and in addition thereto to perform cutting out operations heretofore impossible in machines capable only for flat press work. My present machine, therefore, is intended for use as a "universal" cutting out press, particularly intended for work on shoes, leather and shoe materials, and where the work is of widely varying contour and design.

In the present manufacture of openwork shoes, slippers, pumps and the like, particularly those intended for ladies' wear, it has been customary to first mark and then to cut out on a flat press the openwork portion of the vamp, quarter, foxing or the like before incorporating the same into the shoe upper and usually prior to uniting the cut out portion to any other portion of the upper. Then it was necessary to leave the linings of the shoe adjacent the cut out machine intact in order to prevent the distortion of the openwork portion during lasting. Then after the shoe was otherwise completed, it was necessary to cut out these linings by hand, and ink and finish the edges, etc., all this prior work requiring repeated handlings by skilled operators of each and every portion of the openwork shoe, cutting the same out with a hand tool, and resulting in unsatisfactory work, spoiled uppers and lack of uniformity in out-put.

My present invention is intended to obviate the difficulties above noted in manufacturing openwork shoes, and enables these shoes to be made by a new process, as explained in the patent granted to B. B. Brodfuehrer No. 1,605,916, dated November 9, 1926; and my Patent No. 1,675.295, granted to me June 26, 1928.

The machine of my present invention is directed to perform the cutting out operations for openwork shoes, following any design desired, as a machine action, and furthermore as a machine operation either before or after the shoe upper portions,—vamp, foxing, quarters, tip, etc.,—are united and united into the complete shoe upper, and preferably also with the thus completed shoe upper united at the heel, thus forming the "closed" article, open only at top and bottom. There are numerous advantages and economies in being able to stitch the upper, vamp, quarters, foxings, etc., together, as is now customary, and to unite the same at the heel, in order to have the shoe upper otherwise all ready for assembling on a last—as explained in my said Patent 1,675,295 copending application Ser. No. 677,319, filed November 27, 1923, but no machine heretofore made, so far as I am aware, has been capable of operating on such a closed upper to cut out the portions necessary to form the openwork part of the same. My present machine performs this cutting out operation and an important feature of the same is that it will operate with equal facility upon the sides of the upper, particularly a closed upper, upon the quarter sections, through the vamp, foxing, tongue portion, or tip. I am enabled to perform these operations by having provided means which will enable any portion or portions of the work, upper or other material to be presented, while held flat and preferably while held under tension, and to provide ample spaces or clearance for those portions of the material not being acted on by the cutting devices. A most important feature of the entire machine is in this provision of protecting spaces or clearance, guarding and protecting that portion of the work not desired to be cut, and yet enabling the openwork portion which is to be formed, to be quickly, accurately and removably presented to the cutting devices. Furthermore, this provision of the clearance, space, and protecting recesses for portions of the work is of ample area to facilitate the operator adjusting and holding the work, not only when positioning the same, but during the cutting operation, if desired, independently or in addition to a hold-down or mask, as will be hereinafter explained. This feature is of great importance, and being distinctly new, I claim the same broadly herein.

A further important feature consists in the provision of a machine and operating instrumentalities which will enable the openwork designs or formations to be cut out entirely through the upper or upper and lining and without previously marking or forming any pattern on the work. This desirable result I accomplish by the provision of work cutting and work holding means which will enable the cutting devices to be alined or positioned with regard to a fixed edge or portion of the shoe upper itself; thus insuring the cutting out action with exact uniformity upon successive uppers of similar design. This feature is most important in practice, as the cutting out action leaves a plurality of narrow strips or straps and the spacing or width of these straps is most important. By means of my invention, wherein the straps are formed with exact relation to the edge or predetermined portion of the shoe upper, such as the top seam, side stitching or other fixed portion in the design, the resulting openwork is formed accurately with all straps, widths and strips of proper width, and with opposite quarter sections, for example, in perfect cooperation. This is an important advantage resulting from cutting out the openwork portions after the shoe upper sections have been stitched and united, as distinguished from first cutting out the upper sections and then stitching and uniting same.

An additional feature in the present machine is that I have devised, invented and developed a novel type of combined anvil and cutting device, which I have termed a cutting anvil. In a machine of this type, it will be appreciated that it is necessary to have a capacity for constant change, variations and differences in design of the cut out portion, particularly when shoe uppers are being operated upon. Therefore, it is essential that interchangeable cutting devices be provided and I have devised in connection with the cutting devices an anvil on which the material is cut and permitting a ready interchange of designs and devices. Also it is desirable and in many instances it is essential that the material be held or clamped in fixed predetermined position, and therefore I have combined, in my cutting anvil, the cutting devices, an anvil-like member on which the work is held, together with clamping means, all constituting a complete self-contained unit, viz, my cutting anvil, which unit, furthermore, is interchangeable with others for operation in the same machine. Therefore my present invention includes means capable of instantly changing the machine from cutting one design or pattern, to an entirely different design or pattern, by the same interchangeability and adjustability of cutting anvils. Each cutting anvil has preferably, both the cutting devices for forming the cut out or openwork portions, together with a cooperating clamping member, adapted to hold the work firmly in position for the cutting out operation.

A still further feature and one of great importance, consists in the fact that I utilize the clamping means either alone or as a combined clamp or holder for the work, and preferably as a guiding, or gauging, or alining device, to insure that the cutting means and work will register. This enables me to eliminate entirely any marking or previously stencilling a design on the upper, before it is cut, as I can rely entirely upon the combined gauging and holding or clamping member to adjust the work relatively therewith, and the resulting cutting out operation insures perfect registering and alining of the design cut out, as, for example, with the fixed edges of a shoe upper. This feature in practice gives the important advantage of enabling the operator to speed up work on this machine, to quickly and accurately aline the work with regard to the clamp, because the latter is outside and on top of the work, while the cutting devices are underneath and out of sight. The operator need only position the work with regard to the topmost portion of the cutting anvil, viz, the clamp, and then at once position the same under a moving part such as a plunger and the tripping of a treadle will complete the cutting out action.

The clamping device as above noted constitutes also a protecting guard for that portion of the work adjacent the cutting out devices, during the cutting operation, and furthermore I form this clamp as a complete guard partly or entirely around the cut-out portion. Thus I hold the part of the work to be cut out, not merely at one or two points, but partly or entirely around the openwork portion to be formed, the clamp being cut out proportionately or in cooperation with the design of the openwork and protecting, as well as holding the material being operated upon. This clamp is preferably made of thin sheet metal, and preferably also is hinged or otherwise removably attached to the cutting anvil as above explained, and is so constructed and arranged as to place the work under proper tension to prevent displacement of same during the cutting out operation. My improved clamp, which I have designated as a "mask", is of great importance in the operation of cutting out, perforating, or ornamenting parts or portions of material. Heretofore great difficulty has been experienced in operating upon such articles as vamps, toe tips, or the like, in flat bed cutting machines, as the material would wrinkle, would not lie evenly, and no prior clamping or holding devices of which I am aware, extended closely adjacent the line of pressure of such prior machines, except only at the immediate front of the machine. My invention of a holding, protecting, and also gauging mask, performs the very important and vital function of clamping the material to be operated upon, sufficiently along the side or sides of the cutting or ornamenting action and preferably partly or even entirely around the portion to be operated upon. Therefore, by extending my mask or clamping action beyond the former line of holding and partly surrounding the cut out or ornamented portion, I have eliminated prior difficulties, and am thus enabled to operate upon flat bed work much more advantageously than was formerly possible. In addition to this feature, my mask, clamp or guard in any form and in combination with protecting spaces, recesses or clearance, as herein explained, is new, and is claimed broadly herein. This clamp also, being of thin sheet metal, when adapted to press down upon a completed shoe upper, can easily have extra portions cut out, for any purpose as at the tip seam or other place where there is an extra mass or thickness of material, and thereby prevent damage to the same, eliminate breaking of stitching, marring of patent leather, tearing strain on satin, suede or other material of which the upper is made.

Positioned and arranged under the protecting guard or mask I provide a yieldable element, cooperating with the portion of the material adjacent the sections to be cut out, to yield with the pressure or the plunger during the cutting out action, and acting as a "stripper" element, during the release of the pressure and to lift and restore the uncut part of the work above the cutting dies. This stripper element may be any yieldable member, such as a steel plate mounted on a plurality of springs and having a form or contour substantially corresponding to the design of the cut-out die and resulting cut-out portions on the work. While I preferably utilize a metallic yielding strip, any yielding element such as rubber or the like can be employed for this yielding and stripping action.

In addition to the fundamental features above noted, I have provided means which will insure the accurate operation of the cutting out action. I have incorporated my invention, as shown in the accompanying drawings, in a machine having a movable plunger to act upon the work, and through a yielding medium, such as heavy paper or the like, pressing through the paper and upon the work through the open portion of the clamp, pressing the work downwardly past the cutting devices on the anvil, permitting the cutting devices to penetrate the paper and thus insure a clean, clear cut entirely through the work. In order to insure an equal cutting throughout the entire extent of variations in design of cutting devices, I have arranged the pressure device, plunger or other moving member, and the position of the cutting devices, in a substantially balanced relation, so that the line of pressure of the plunger cooperating with the plunger resisting means will always be equally or substantially equally distributed throughout its action on the cutting edges, irrespective of the variations in contour of the cutting edges, which latter are formed of differing designs particularly for the openwork portions of a shoe. I accomplish this by having the supporting means or cutting anvils so positioned and arranged relatively with the line of pressure of the cutting operation; and the design carried by each anvil, that the supporting means, when the work or shoe upper is positioned thereon, and moved under the plunger, will cooperate with a fixed stop so as to bring the particular design carried by that supporting means, under the same central line of pressure, or balanced relationship with the plunger, as is necessary for equal cutting pressure. The feature of having the work firmly, rigidly and properly supported to resist the line of pressure of the cutting out action, is of very great importance in this type of machine, because of the difficulty of cutting through leather, through leather and canvas, through a shoe upper and only partly into the paper backing, and also because of the peculiar configuration and difficulty of supporting many of the cut out dies, especially when in curved or intricate designs. In order to prevent "springing" or distortion of the dies, and to insure uniformity of successive cut outs for each pair of shoes, and each shoe upper with the same design, the dies must be rigidly supported and directly under the line of pressure during the cutting out operation. To insure the accurate cutting out operation, and to carry out the "balanced" position as above explained, while also affording the clearance desirable for permitting this machine cutting operation, I support the die on a firm, rigid anvil or other equivalent work support, so that the line of pressure will be rigidly resisted and all "springing" and distortion of the dies prevented. In the particular form of die and supporting member, anvil or slide which I utilize in the present case, and wherein one portion of the die holder projects or overhangs same, to facilitate the fitting of a closed upper therearound, I provide a cooperating supporting post so that the die will be rigidly positioned, and the pressure from the plunger firmly resisted, thereby insuring the smooth and uniform cutting action of the dies, which is the important result desired. This gives long life to the cutting edges, insures equally clean cut edges for any design, and insures a uniform and satisfactory operation of the machine.

An additional feature in the machine of my present invention and as shown in the accompanying drawings, consists in the fact of extra safety devices. Thus I have provided mechanism automatically actuated, which will prevent the starting of the machine, until the cutting anvil is in exact and predetermined position under the plunger. This automatic safety device comprises a dog or plunger which must be moved by the cutting anvil itself during the last portion of its positioning action, to thereby operate through mechanical levers or the like, to release means normally preventing the starting of the machine. Thus the operator cannot actuate the foot treadle and start the clutch and the machine until the die is accurately positioned, thereby preventing danger or damage from the plunger striking any part of the die work, to cause breakage or damage.

Additional novel features consist in the supporting devices for the cutting anvil, to permit great pressure thereon, and yet to prevent distortion or "springing" providing a firm and balanced pressure-resisting support in combination with the clearance desired; novel clutch means, insuring the accurate operation of the plunger, anvil and reversible supports for the cutting anvil; and other novel means, combinations of parts, and important advantages.

Referring to the drawings, illustrating preferred embodiments of my present invention, Fig. 1 is an elevation of the left side of the machine;

Fig. 6 is an enlarged detail on the line 6—6 of Fig. 3;

Fig. 9 is a vertical sectional elevation on the line 9—9 of Fig. 3;

Fig. 11 is a plan view of a cutting anvil showing one exemplification of a design to be cut out, for example, on the upper of a shoe;

Fig. 12 is a vertical sectional side elevation of a carrying block with a cutting anvil positioned thereon and with the upper in position to have a design such, for example, as that illustrated in Fig. 11 and stamped out therefrom, the protecting mask in this figure being shown out of its normal position;

Fig. 13 is a view similar to Fig. 12, but with the mask folded down in position on the upper and with the plunger of the press moving toward the cutting anvil, a strip of heavy paper being positioned between the plunger and the cutting anvil;

Fig. 14 is a view similar to Fig. 13, but with the plunger moved into position with respect to the anvil so as to cut out a design on the shoe upper;

Fig. 15 is a sectional elevation of a fragment of a stripper plate;

Figure 1:
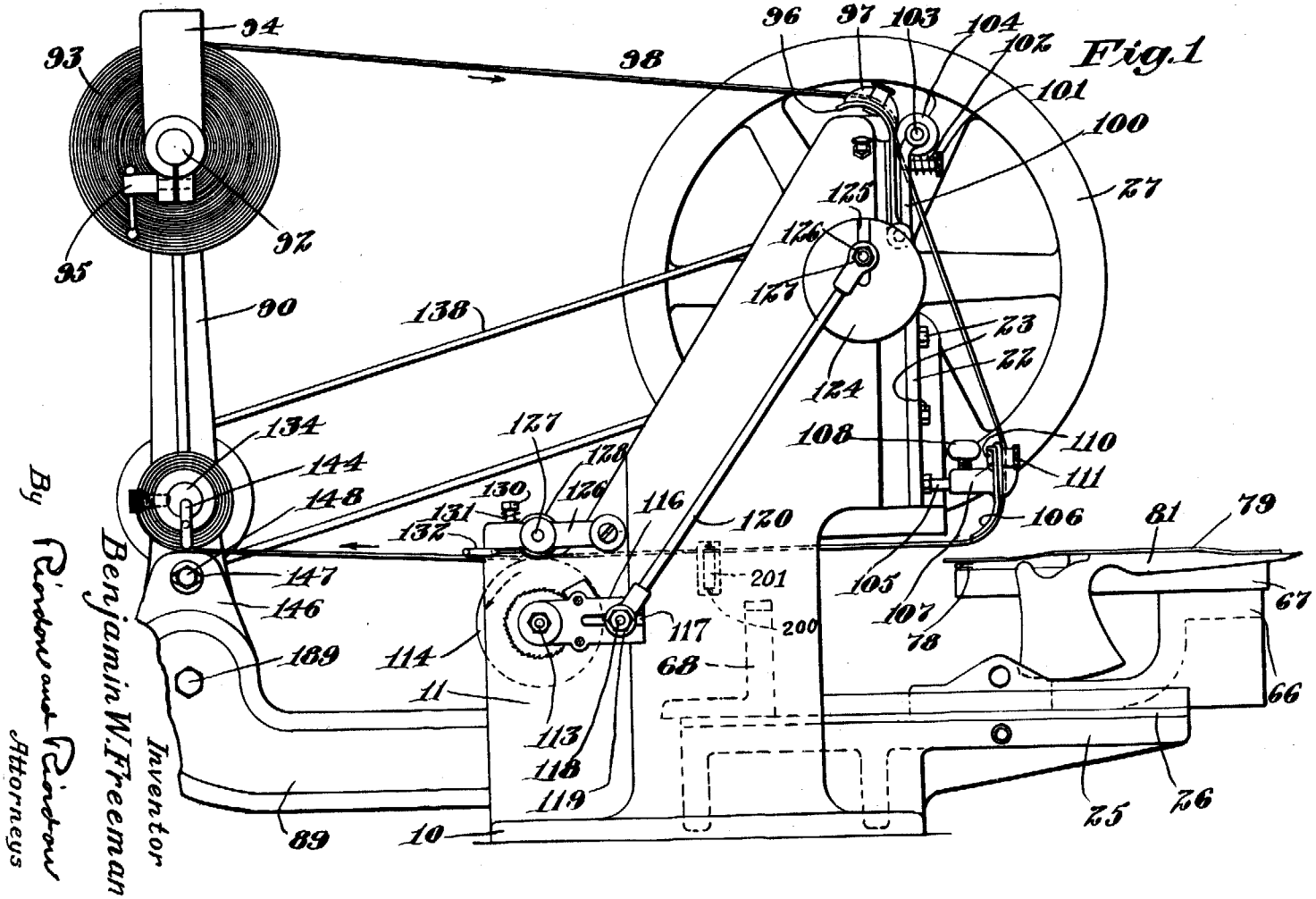

Referring to the drawings, 10 designates a base having formed integral therewith and extending upwardly therefrom a body 11 of a machine, which machine is adapted to rest on a bench or other support, and rotatably mounted in bearings 12 formed in the body 11 and adjacent to the top thereof is a power shaft 13. Keyed to the shaft 13 intermediate the ends of such shaft and between the bearings 12 is an eccentric 14 on which is rotatably mounted an eccentric ring 15 that is, in turn, adjustably mounted for rotation in an eccentric strap 16, this eccentric strap being split at one end and this end being provided with laterally extending lugs 17. One of these lugs 17 is drilled as a clearance hole for the body of a bolt 18 while the other of the lugs 17 is drilled to receive the threaded end of such bolt 18 and this bolt 18 is utilized, in connection with the lug 17, as a means for drawing the split end of the eccentric strap together in order to clamp the eccentric ring 15 therein. This eccentric strap 16 is formed integral with one end of a connecting rod 19, the other end of this connecting rod being pivotally attached to a shaft 20 secured in the lower end of a crosshead 21. This crosshead 21 is slidably mounted for vertical movement in guideways formed on the machine by means of straps 22, these straps being secured to the machine by bolts 23. The plunger 21 is provided on its lower end with a removable face 24. Formed integral with the body 10 and extending forwardly therefrom is a table or platen 25, which platen is provided on its upper face and on either side thereof with guideways 26 for a purpose to be hereinafter described. The platen 25 lies in the path of movement of the vertically movable plunger 21.

Figures 4, 5:
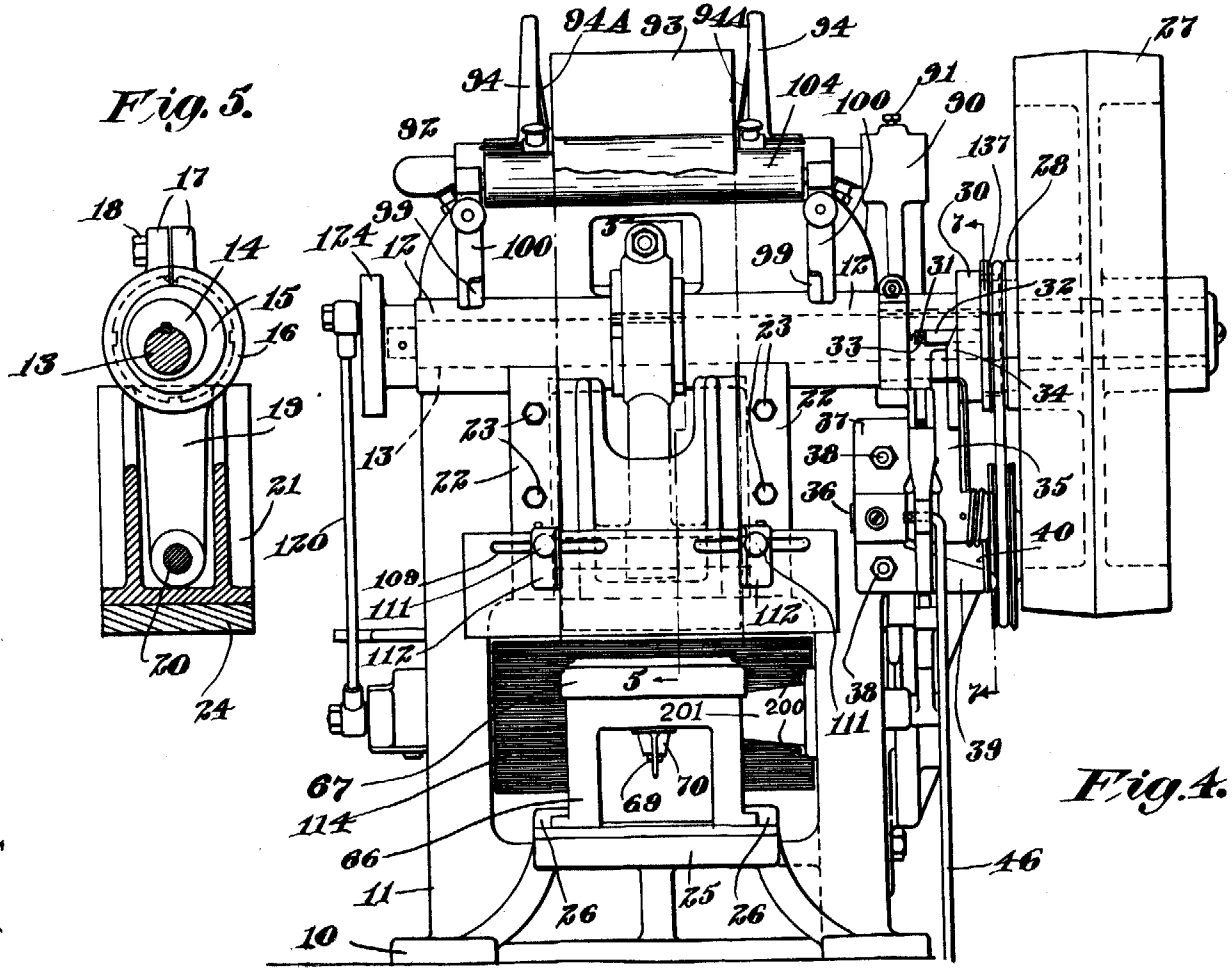
Fig. 4 is a front elevation of the machine.
Fig. 5 is a detail sectional elevation on the line 5—5 of Fig. 4.
Figure 7:
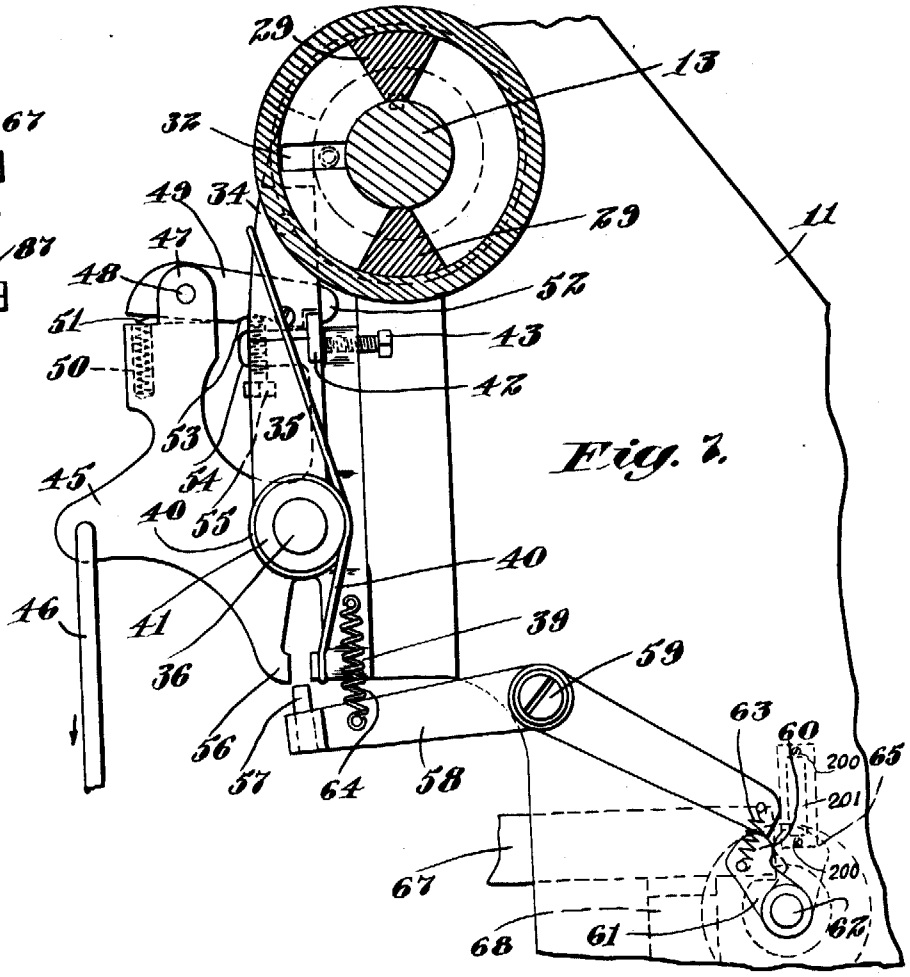
Fig. 7 is a vertical sectional elevation on the line 7—7 of Fig. 4.

Rotatably mounted on the main shaft 13 and at one end thereof is a driving pulley 27, power being furnished from any suitable source to such pulley 27 to drive the machine. The inner face of the hub 28 of the driving pulley 27 is counterbored and secured to the bottom of such counterbored portion is a member provided on the face thereof adjacent the opening of the counterbored portion with two radially arranged sectors 29, as shown in Fig. 7. Secured to the shaft 13 is a member 30 provided with a longitudinally arranged slot 31. Slidably mounted in the slot 31 is a rectangular plate 32, a spring 33 being arranged between the end of the slot 31 and such plate 32, which spring tends to force the plate 32 to the right, as viewed in Fig. 4 or into such a position as to engage with one or the other of the sectors 29. The plate 32 is provided on its outer edge with a V-shaped slot 9 in which is adapted to fit a wedge-shaped member 34. In the position shown in Fig. 4 with the wedge-shaped member 34 in the slot 9, the plate 32 is held to the left against the tension of the spring 33 and with its outer end out of engagement with the wedge-shaped sectors 29. Under these circumstances, the pulley 27 will be freely rotatable on the shaft 13 and the shaft 13 will remain stationary. If the wedge-shaped member 34 is withdrawn from the V-shaped slot 9, the spring 33 will force the plate 32 to the right, as viewed in Fig. 4, and such plate will be engaged by one or the other of the wedge-shaped sectors 29, thus locking the pulley 27 and the shaft 13 together and this condition will prevail until the wedge-shaped member 34 is replaced in its original position to engage in the wedge-shaped slot 9. The wedge-shaped member 34 is secured to the upper end of an arm 35 rotatably mounted on a shaft 36 secured in a member 37 attached to the body 11 by bolts 38. The member 37 is provided with a projection 39 which extends upwardly toward the pulley 27 and secured to the end of this projection is one end of a spring 40, which spring is coiled around the hub 41 of the arm 35 and extends upwardly, its upper end entering a perforation near the upper end of the arm 35, as clearly shown in Figs. 4 and 7. This spring 40 is arranged to cause a rotative movement of the arm 35 about the shaft 36 in a clockwise direction, as viewed in Fig. 7, so that, normally, such arm 35 will maintain the plate 32 in its left hand position as viewed in Fig. 4 against the tension of the spring 30 and therefore the pulley 27 is free to rotate on the shaft 13. Secured to the front edge of the arm 35 in any suitable manner is a plate 42. Engaging such plate is an adjusting screw or bolt 43 that is threaded through a lug 44 formed integral with the body member 11, such adjusting screw or bolt 43 being utilized to adjust the inward or right hand movement of the arm 35 about the shaft 36. Rotatably mounted on the shaft 36 is a member 45. Pivotally mounted on said member 45 is the upper end of a treadle rod 46 which extends downwardly to a point adjacent the floor and is provided with an ope. ing treadle (not shown) for the convenience of the operator. Formed on the member 45 at its upper end are lugs or ears 47 in which is pivotally mounted on a pin 48 the latch member 49. The member 45 is drilled at 50 to receive a coil spring 51, the upper free end of this spring engaging with the rearwardly projecting end of the latch member 49 and tending to rotate such member 49 in a clockwise direction, as viewed in Fig. 7. The end of the latch member 49 remote from the pin 48 is provided with a hook end 52 which engages with the member 42. It is obvious, from an inspection of Fig. 7, that if the treadle rod 46 is pulled downwardly in the direction of the arrows shown, the hook 52 engaging with the plate 42 on the arm 35 will move the upper end of such arm 35 in an anti-clockwise direction and thus tend to pull the wedge-shaped member 34 out from the V-shaped slot 9 in the plate 32, thereby allowing such plate 32 to be moved to the right, as viewed in Fig. 4, under the influence of the spring 33. The under face or edge of the latch member 49 is cut away at 53 to form a cam. Formed integral with the body member 11 and extending outward therefrom is a lug 54 through which is threaded a bolt 55 and the upper end of such bolt 35 engages with the cam surface 53, as clearly shown in Fig. 7. The cam surface 53 is so arranged relative to the screw 55 that, as the latch member 49 moves to the left, as shown in Fig. 7 when the treadle rod 46 is moved downwardly in the direction of the arrow, the hook end 52 will move upwardly about the pin 48 as a center thereby releasing the plate 42 after the wedge-shaped member 34 has been moved from the V-shaped slot 9 in the plate 32. Under these circumstances, it will be apparent that, once the wedge-shaped member 34 has been removed from the V-shaped slot 9, the spring 33 will force the plate 32 to the right and into the path of movement of the wedge-shaped sectors 29 and the spring 40 will move the upper end of the arm 35, and therefore the wedge-shaped member 34, into position whereby the wedge-shaped member 34 will be ready to force itself into the V-shaped slot 9 when the plate 32 has completed one revolution. The above construction, therefore, provides a means for positively allowing but a single revolution of the shaft 13 by power transmitted from the pulley 27.

Figure 2:
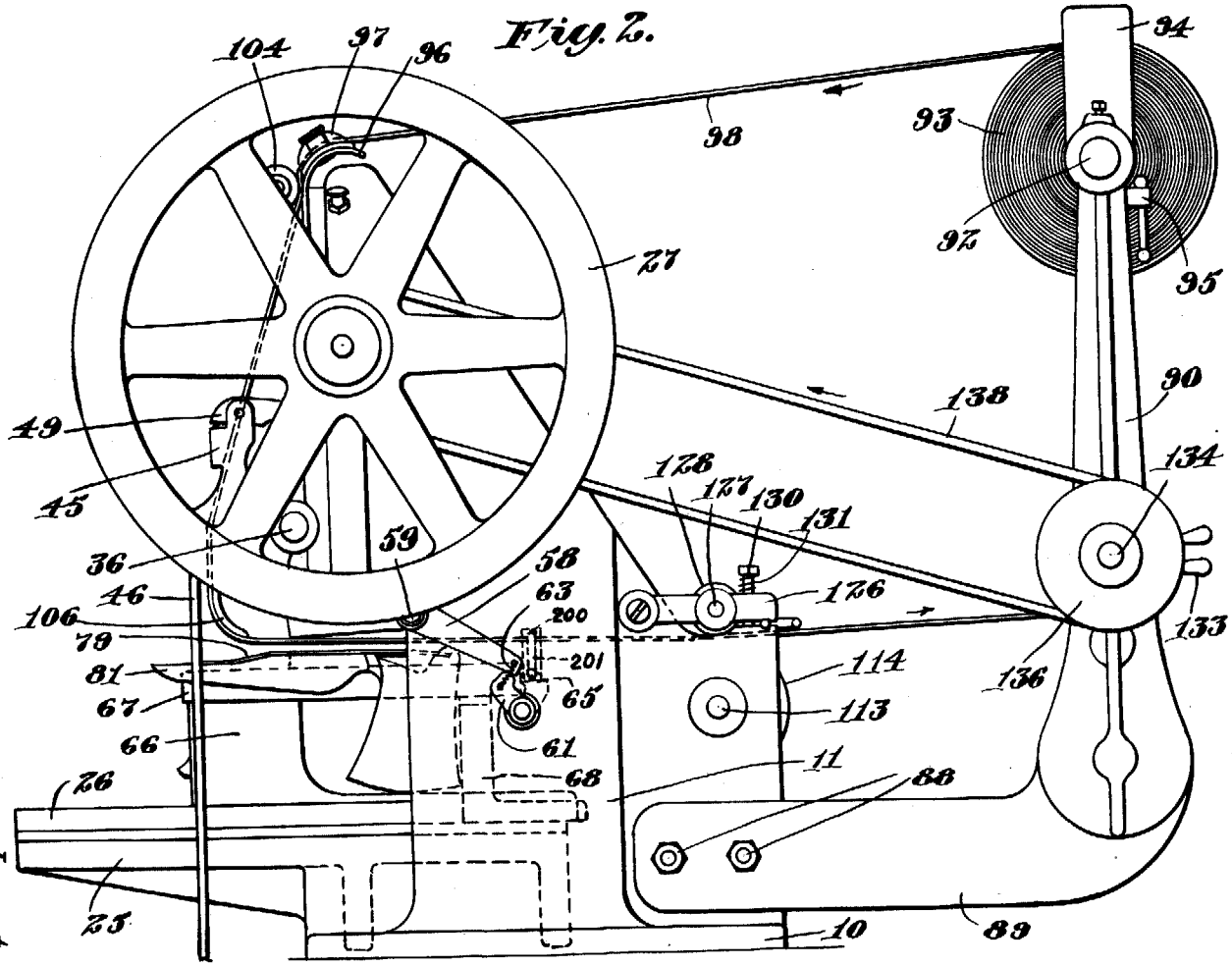
Fig. 2 is an elevation of the right side of the machine.

As a safety means for use in connection with the one revolution clutch above described, I have provided on the member 45 a downwardly and forwardly extending member 56 which lies directly opposite, but spaced apart from, the projection 39 formed on the member 37. Normally lying between the members 56 and 39 and filling the space therebetween is a plate 57 which is secured to, and extends upwardly from, the end of one arm of a bell crank lever 58, which bell crank lever is rotatably mounted on a shaft 59 secured to the body member 11, as clearly shown in Fig. 7. The other end of the arm of the bell crank lever is engaged by a cam surface 60 formed on an arm 61 secured to a shaft 62 rotatably mounted in the body member 11, a spring 63 secured at one end to the arm 61 and the other end to the arm of the bell crank lever 58 holding the cam surface 60 and the end of the arm of the bell crank lever 58 in engagement with each other. Secured to the body member 11 is one end of a coil spring 64, the other end of which is secured to the bell crank lever 58 adjacent the plate 57 and which spring 64 tends to rotate the bell crank lever 58 in a clockwise direction, as viewed in Fig. 7, and forcing the plate 57 upward and into position between the members 56 and 39. Secured to the shaft 62 intermediate the ends thereof is an arm 65, which arm lies above the platen 25, as clearly shown in Fig. 2. Arranged for sliding movement in the guideways 26 on the top of the platen 25 is a base 66 which has secured thereon and at its upper end a cutting anvil 67, the details of which will be later described. As best shown in Figs. 1 and 2, the protecting spaces or clearance at each side of the slide 66 and cutting anvil 67, when the same is in operative position under the plunger, provides a substantial working space for the hands of the operator above the platen 25 and below the plunger face 24 of the machine and at the sides of the work supporting and cutting device to facilitate adjusting and holding of the work without danger of injury to the operator's hands. Adjustably secured to the top of the platen by wing screw 168 is an anvil rest 68, which anvil rest acts as a support for the relatively unsupported end of the cutting anvil 67. Secured to the frame of the machine by screws 200 is a stop plate 201 which lies in the path of movement of the cutting anvil 67 and in such relation thereto that when the cutting anvil 67 engages the stop plate 201, the die 75 on such cutting anvil will be correctly positioned in the line of travel of the plunger 21. The arm 65 is so positioned on the shaft 62 and with relation to the rear end of the cutting anvil 67 that when the anvil 67 is moved to its most rearward position with the base 66 in engagement with the anvil 67, the rear end of such cutting anvil 67 will engage with the arm 65, rotating the shaft 62 and causing the cam surface 60 to engage with the end of one arm of the bell crank lever 58, rotating such bell crank lever in an anti-clockwise direction, as viewed in Fig. 7, and moving the attached plate 57 downward from between the members 56 and 39. At this instant the end of the cutting anvil 67 comes into engagement with the stop plate 201. When this point is reached, and only when this point is reached, will it be possible for the operator, by pressing on the treadle (not shown), to pull the treadle rod 46 downward and move the wedge-shaped member 34 out from between the projection 33 and the hub 28. Of course, as the member 45 is rotated about the shaft 36, the hook end 52 of the latch member 49 will be released from the arm 35 and the spring 40 will tend to move the arm 35 back into its initial position. With this device, therefore, positive safety is assured in that it is impossible to operate the clutch mechanism until the work holding devices are correctly positioned beneath the plunger 21 and also it is impossible for the operator to allow the shaft 13 to continuously rotate.

Referring now to Figs. 11–17 inclusive wherein are shown the cutting anvil and attached work and mechanism, it will be noted by reference to Fig. 12 that the anvil 67 is removably secured to the base 66 by stud 69 and wing nut 70, a pin 71 secured to the under side of the cutting anvil 67 cooperating with a hole 72 in the upper surface of the base 66 for correctly positioning the cutting anvil 67 on such base. The cutting anvil 67 is perforated at 73 and secured to the upper surface of the anvil by screws 74 is a cutting die 75, the cutting dies being of any shape or form such, for example, as shown in my Patent No. 1,675,295.

Figure 3:
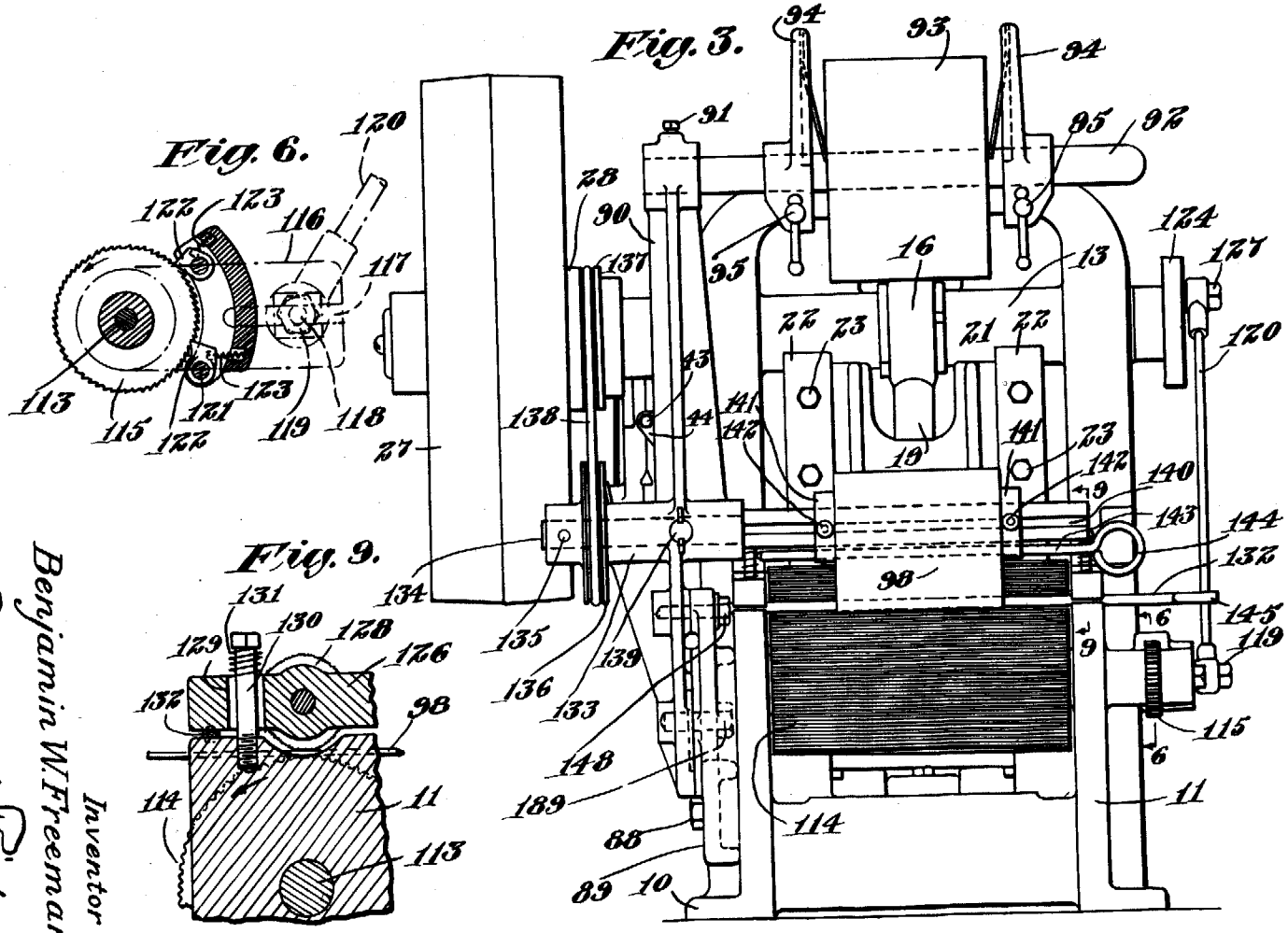
Fig. 3 is a rear elevation of the machine.
Figure 10:
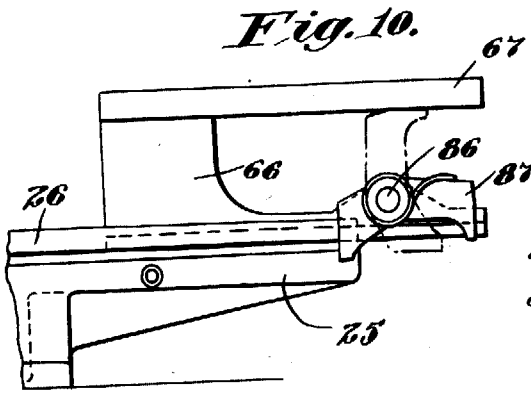
Fig. 10 is a fragmentary side elevation of the cutting anvil arranged on its carrying block.
Figure 8:
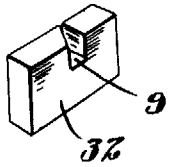
Fig. 8 is an enlarged detail of the tripping lever block for the clutch.
Figure 16:
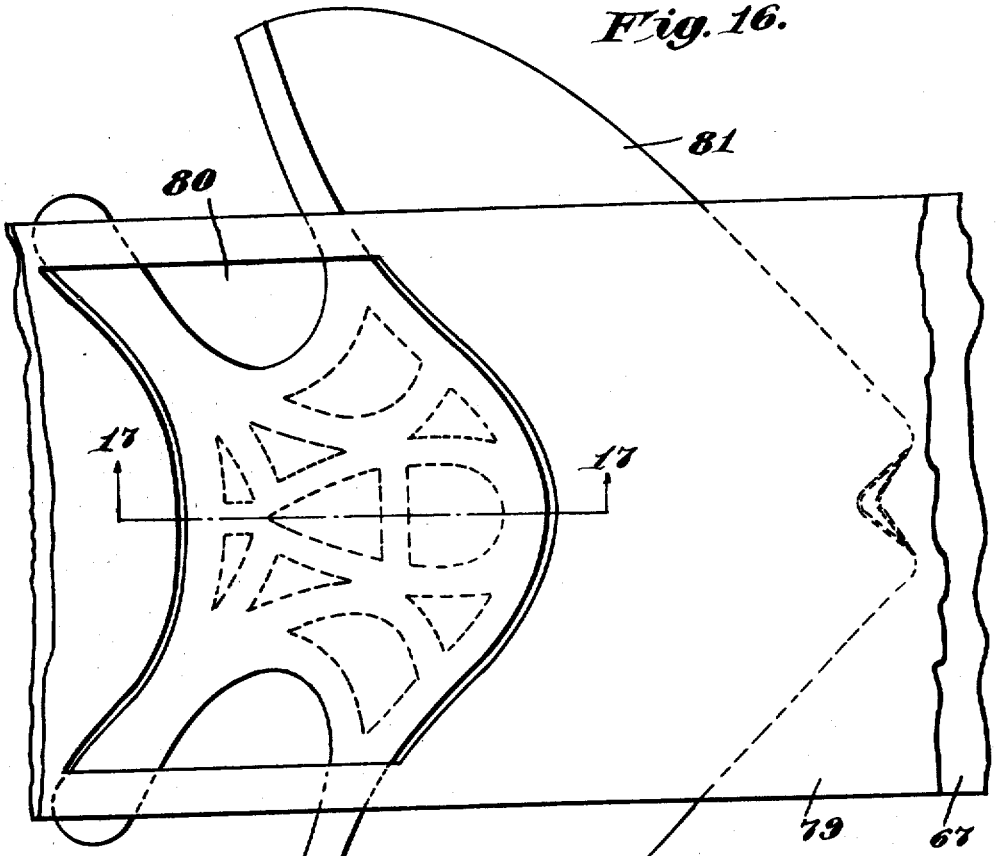
Fig. 16 is a plan view showing the mask in position on an upper.
Figure 17:
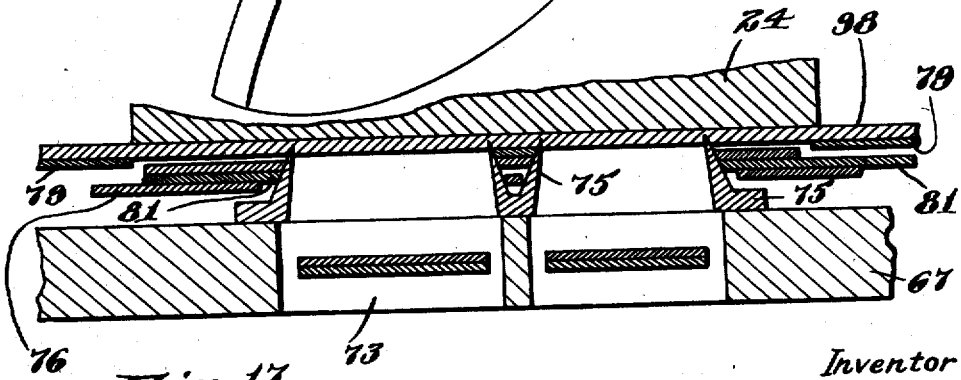
Fig. 17 is a section on the line 17—17 of Fig. 16.

Associated with the die structure 75 is a stripper plate 76 and lying between the stripper plate and the die structure 75 are compression springs 77 which tend to hold the stripper plate slightly above the plane in which lies the cutting edge of the die structure 75. Hingedly secured to the rear end of the cutting anvil 67 by hinge 78 is a mask 79. In this mask 79 is cut an opening 80 of such shape as to allow an upper 81 to be accurately positioned on the cutting anvil 67 with respect to the die 75 secured to such anvil. To facilitate the correct positioning of the upper on the cutting anvil 67, the contour of the opening 80, or certain portions of such contour, correspond in size and position, relative to the cutting die 75, with a seam or other fixed portion of the upper 81. With this arrangement, it is possible to correctly position an upper on the cutting anvil and in proper registry with the cutting die 75, even though it is impossible, under the circumstances, to directly observe the relation existing between the cutting die and the upper because of the fact that such cutting die is completely hidden by the upper. The mask 79 is of the shape, in longitudinal section, as shown in Fig. 13; that is, the left hand portion adjacent the hinge member 78 is engaged by the portions 82 and 83 of the mask. Such portions will hold one end of the upper 81 in approximate position and the complete position of the upper will then take place, after which the operator will pull down the mask 79 into the position shown in Fig. 13 where it will be observed that the front portion of the upper is engaged by the portions 84 and 85. I have described the base 66 as being slidable in the guideways 26 and have shown such a base with the cutting anvil thereon so arranged in the guide ways 26 as to have the end of the cutting anvil 67 carrying the hinge 78 come into engagement with the member 65 secured to the shaft 62. It is obvious, therefore, that I may reverse the position of such base 66 in the guideways 26. It will be noted from an inspection of Figs. 2 and 3 that the end of the cutting anvil 67 carrying the hinge 78 rests on top of the stop 68, this for the reason that such stop 68 acts as a support for the free end of such cutting anvil 67 and insures that the cutting anvil 67 will be held perfectly rigid against the shock imparted to it by the plunger 21. When the base 66 is reversed in the guides 26, as shown in Fig. 10, the stop 68 can no longer support the free end of the cutting anvil 67. I have, therefore, on the base 66 pivotally mounted on shaft 86 a stop or support 87 which may be swung into position, as shown in dotted lines, so that, regardless of the manner of positioning the cutting anvil 67 on the platen 25, it will be firmly supported throughout its entire length and width against any shock imparted to it by the plunger 21.

One of the important features of my invention is the provision of means for utilizing a single continuous strip of paper of indeterminate length between the plunger and the cutting die and utilizing practically every portion of such paper. Heretofore in operating cutting dies for cutting out designs on leather and the like, it has been usual and necessary to use a relatively long strip of paper for each cutting operation performed, and as but a very small portion of such strip of paper was used, the waste was considerable. My present device obviates the objections to prior structures and enables me to utilize every available portion of paper in a strip of indeterminate length. Secured to the body member 11 and at one side thereof by bolts 88 is a member 89. Pivotally attached to the rear end of the member 89 on bolt 189 is the lower end of a standard 90. The member 89 is provided with a portion 146 above the pivot bolt 189 and this portion 146 is provided with an arcuate slot 147 through which passes a bolt 148 that screws into the standard 90. By means of the arcuate slot 147 and bolt 148 the standard 90 is capable of limited adjustable movement about the bolt 189 as a center. At the upper end of this standard 90 is secured by setscrew 91 a shaft 92, which shaft lies parallel with the driving shaft 13. On the shaft 92 is adapted to be placed a roll of paper 93 and on the shaft and on each side of the roll of paper 93 are adjustable brackets 94, such brackets being adjustably secured to the shaft 92 by screws 95. Secured to the front of the body member 11 and at the top end thereof is a curved guide plate 96 provided at either side thereof with adjustable guide plates 97 for guiding the edges of the paper 98 fed from the roll 93. The front of the body member 11 below the curved guide plate 96 and on either side of such body member is provided with forwardly extending lugs or ears 99 and to each of such ears 99 is pivotally attached the lower end of a bearing arm 100. Screwed into the front of the body member 11 and extending through a perforation in each of the bearing arms 100 is a thumb screw 101 and located between the head of such thumb screw 101 and the associated bearing arm 100 is a coil spring 102 which tends to force the bearing arms 100 about their pivot point as a center in an anti-clockwise direction. Rotatably mounted at the upper end of the bearing arm 100 is a shaft 103 on which is secured a roller 104, which roller bears against the paper 98 as it passes over and around the curved guide plate 96. Secured to the lower end of each of the guide plates 22 and extending forwardly outward therefrom, as shown in Fig. 1, are studs or rods 105. Numeral 106 designates a curved guide plate over which the paper 98 passes, and secured to the rear face of such guide plate in any suitable manner are lugs 107 spaced apart from each other and drilled to each receive one of the studs or rods 105, acting thereby as a means for positioning the curved guide plate 106 on the machine. The lugs 107 are drilled and tapped to receive the thumb screws 108 and by means of which the curved guide plate 106 may be adjustably mounted on the studs or rods 105. The upper portion of the curved guide plate 106 is provided with a pair of slots 109 in alinement with each other, as clearly shown in Fig. 4, and passing through such slots are studs 110 that are threaded at their outer end to receive a thumb nut 111. The studs 110 and thumb nuts 111 act as means for securely and adjustably positioning on the outer end or face of the curved guide plate 106 the edge of the guides 112 arranged one on either side of the strip of paper 98.

Rotatably mounted in suitable bearings in the body member 11 and lying parallel to the shaft 92 or the drive shaft 13 is a shaft 113 on which is securely mounted a corrugated roller 114. The shaft 113 extends outward beyond the side of the body member 11 and has secured adjacent its extreme outer end a ratchet wheel 115. Rotatably mounted on the shaft 113 is a bracket 116 provided with a longitudinal slot 117 in which is adjustably mounted by bolt and nut 118 and 119 respectively the lower end of a connecting rod 120. Pivotally mounted in the bracket 116 on parallelly arranged spaced shafts 121 are ratchets 122, springs 123 associated one spring with each of the ratchets 122 forcing such ratchets into engagement with the ratchet wheel 115. It will be obvious, from an inspection, for example, of Fig. 6, that an oscillatory movement of the bracket 116 will cause an intermittent or step by step movement of the ratchet wheel 115, and therefore the shaft 113, in the direction of the arrow shown in such figure. Secured to the shaft 13 remote from the driving pulley 27 is a face plate 124 provided with a radial slot 125 in which is adjustably mounted by means of bolt 126 and nut 127 the upper end of the connecting rod 120. The radial slots 117 and 125 make it possible to alter the extent of oscillatory movement of the bracket 116 imparted to it by the intermittent rotary movement of the shaft 13. Pivotally mounted on the body member 11 on each side of said member and above the corrugated wheel 114 are arms 126 and rotatably mounted on such arms in suitable bearings formed therein is a shaft 127, such shaft lying above, and parallel to, the shaft 113. Secured to the shaft 127 is a corrugated feed roll 128 which cooperates with the corrugated feed roll 114 above described. Each of the arms 126 is provided adjacent its free end with an elongated vertical slot 129 through each of which passes a stud 130 that screws into the body member 11, as clearly shown in Fig. 9. Between the under face of the head of the stud 130 and the upper surface of the arm 126 is arranged a coil spring 131 which exerts a downward tension on the arm 126 and tends to hold the corrugated roller 128 in engagement with the corrugated roller 114. The paper 98 is fed between the corrugated rolls 114 and 128, an intermittent rotary motion being imparted to the corrugated roll 114 by the oscillatory movement of the arm 116, and the paper 98 will be fed rearwardly of the machine. Secured between the body member 11 and the bearing arms 126 and located above, and extending transversely of, the paper 98 is a guide rod 132. The paper passes under such guide rod 132 and is led rearwardly of the machine. The portion of the rod 132 directly engaged by the body member 11 and arms 126 is flattened, or non-circular in shape, as clearly shown in Fig. 9 and it will be obvious, therefore, by rotating such rod by means of its handle or eye 145 that the end of the arms 126 will be lifted up, separating the corrugated roll 128 a sufficient distance from the corrugated roll 114 to allow the strip of pap[illegible] to be threaded therebetween. Formed intermediate the ends of the standard 90 is a bearing 133 in which is rotatably mounted a shaft 134, which shaft lies parallel to the shaft 92 above described. Secured to the end of the shaft 134 by setscrew 135 is a grooved pulley 136. Formed on the hub 28 of the driving pulley 27 is a pulley groove 137 that is in alinement with the groove in the pulley 136 and in the pulley grooves runs a belt 138 and by means of which rotary motion is imparted to the shaft 134 from the drive shaft 13. Screwing into the bearing 133 so as to engage the shaft 134 is a wing screw 139 for a purpose to be hereinafter described. The shaft 134 extends from the bearing 133 parallel to the shaft 92 and this extended portion is greater in diameter than the portion that passes through the bearing 133. This enlarged portion is provided with a longitudinally extending keyway or groove 140. Slidably mounted on the enlarged end of the shaft 134 are collars 141, each provided with a threaded hole to receive a thumb screw 142, the end of which is guided into the keyway or groove 140. By properly adjusting the collars 141 on the enlarged end of the shaft 134, the strip of paper 98 is properly guided, as clearly shown, for example, in Fig. 3. Each of the collars 141 is provided with a hole, the holes being in alinement with each other and through which passes a rod 143, which rod is provided on its end with an eye 144 and by means of which the rod 143 may be handled or operated. The end of the strip of paper 98 is folded over about two inches from its end and placed under the rod 143. By revolving the shaft 134, the end of the paper 98 is started onto the shaft 134. After the paper has been used and wound from the shaft 92 onto the shaft 134, it may be easily removed from the shaft 134 by withdrawing the rod 143. While placing the folded end of the strip of paper under the rod 143 and while adjustably securing the collars 141 in position, the wing setscrew 139 is utilized to hold the shaft 134 against rotation.

The operation of my improved apparatus is as follows, it being assumed that such apparatus is constructed as above described. An appropriate cutting anvil 67 having secured thereon a cutting die 75 in which is fashioned the particular design desired to be cut from the material is provided. It is assumed that the design on the die 75 is that shown in Figs. 16 and 17 or may be that shown in Fig. 11. A mask 79 is provided with an appropriate cut out 80 of such shape as to allow the seam or other fixed or finished part on the upper to be clearly viewed through such opening and the seam properly centered with respect to the design on the die. This mask 79, to hold, to guard, guide, and protect the work is attached to the cutting anvil 67 by the hinge 78. The stop block 68 is now positioned on the platen 25 in such manner that the die 75 attached to the cutting anvil 67 will be located beneath the plunger 21 when the base 66 is in its rearmost position and against the stop plate 201, and resting on the supporting post 68 in balanced relation to the design of the die so that equal pressure will be placed on all parts of the die. A roll 93 of paper 98, such paper being of substantial thickness as compared to the thickness of the material being worked on, is placed on the shaft 92, drawn over and around the curved guide plate 96 and under the guide tension roll 104, the guides 97 secured in position, the paper passed over the curved guide plate 106 rearwardly of the machine between the corrugated rolls 114 and 128, as above described, the end of the paper 98 folded and passed under the rod 143 and around the shaft 134. The horizontal plane in which is located the cutting edge of the die 75 is spaced apart from the horizontal plane in which lies the lower face of the facing 24 attached to the plunger 21 when such plunger is in its lowermost position, a distance less than the thickness of the strip of paper 98. The strip of paper 98 will, therefore, act as a die block against which the cutting edge of the die works and as a new portion of paper is presented to the dies at every stroke of the press, there is, in reality, a new die block brought into association with the die at every stroke of the press. Further, as the strip of paper 97 is never entirely cut through by the cutting die 75, the amount of movement of the strip of paper for each stroke of the plunger of the press need only be sufficient to present a new uncut surface to the die, and, in practice, such movement of the paper 98 need only be approximately one sixteenth of an inch. In addition to the advantage of having practically a new die block presented to the cutting die at each stroke of the plunger, there is the added advantage that but approximately one sixteenth of an inch of paper of the strip 98 is used up at any one stroke of the die instead of the using up of a strip of paper of from six to fifteen inches in length as has heretofore been the custom. It being assumed that the paper 98 is threaded through the machine, the appropriate die and mask fitted on the cutting anvil 67, and the stop block 68 properly adjusted, power may now be thrown onto the machine through the pulley 27. The operator slides the base 66 back or to the right, as viewed in Fig. 1, throws the mask 79 into an upright position, as viewed in Fig. 12, places an upper 81 into approximate position over the die 75, then swings the mask 79 downward so that the portions 82 and 83 thereof engage with the upper and, by grasping said upper on either side of the cutting anvil 67, the cutout portion 80 may be utilized as a means for registering and centering the seam or other finished part of the upper with respect to the design on the die 75 even though such die 75 is hidden from view by the upper and seam. After properly centering the upper 81, the mask 79 is pulled down into the position shown in Fig. 13. The operator now moves the base 66 with the attached portions thereon in proper position to the left, as shown in Fig. 1, until such base is brought to rest by the stop block 68. Prior to the engagement of the stop block 68 by the base 66, the cutting anvil 67 will engage with the arm 65 on the shaft 62. Such shaft 62 will be rotated and the arm 60 on the outer end thereof will engage with the cam surface on one arm of the bell crank lever 58, moving the other arm downwardly, as viewed in Fig. 7, and withdrawing the member 59 attached to such arm from between the members 56 and 39, as above described. The operator, by now pressing on the treadle (not shown), is able to pull down the treadle rod 46, rotating the member 45 about the shaft 36 and moving the upper end of the member 45 outward, but to the left, as viewed in Fig. 7. The hook end 52 of the latch member 49 engaging with the plate 42 attached to the arm 35 will move the upper end of such arm to the left about the shaft 36, withdrawing the wedge-shaped member 34 from the V-shaped groove 9 in the plate 32. This allows the spring 33 to force the plate 32 to the right, as viewed in Fig. 4, and into the path of movement of the wedge-shaped sectors 29 on the hub 28. Rotary motion is therefore imparted to the shaft 13 which, by means of the eccentrics 14 and 15, will cause a downward movement of the plunger 21, thus bringing the facing 24 on the bottom of such plunger against the paper 98 and forcing the paper 98 into engagement with the cutting die 75. The parts are now in the position shown in Fig. 14 and it will be noted that, while the cutting die 75 has penetrated the strip of paper 98; it has not pierced such paper which, to all outward appearances on one face thereof at least, is intact. As the latch member 49 is moved outward, or to the left, as viewed in Fig. 7, the cam surface 53 on the lower edge thereof rides up on the upper end of the cam screw 55, causing a rotative movement of the latch member 49 about the pin 48 and over the hook end 52 from the plate 42. Immediately such hook end 32 is freed from the plate 42, the spring 40 forces the upper free end of the arm 35 to the right, as viewed in Fig. 7, and moves the wedge-shaped member 34 in position to engage with the V slot 9 in the plate 32 in such plate which was brought into position by the rotative movement of the shaft 13. On engaging with the V slot 9, the wedge-shaped member 34 moves the plate 32 to the left, as viewed in Fig. 4, uncoupling the shaft 13 from the pulley 21. The upper end of the arm 35 engaging with the plate 32 positively stops further rotative movement of the shaft 13. This device is, therefore, a positive one revolution clutch, and but one revolution can be imparted to the shaft 13 by one operation of the treadle rod 46 which must, of necessity, be returned to its initial position in order to allow the hook end 52 and the member 49 to again come into engagement with the plate 42.

Rotative movement of the shaft 13 causes, also, rotative movement of the face plate 124 and, therefore, a complete reciprocatory movement of the connecting rod 120 for each complete revolution of the shaft 13. Reciprocatory movement of the connecting rod 120 imparts a reciprocatory movement to the arm 116 and the pawls 122 engaging with the ratchet wheel 115, impart an intermittent rotary movement to the shaft 113. The corrugated feed roll 114 on the shaft 113 and the corrugated feed roll 128 gripping the paper 98 therebetween, impart a feeding movement to the left, as viewed in Fig. 1, to such paper. As the slight length of paper 98 is fed to the left, as viewed in Fig. 1, by the feed rolls 114 and 128, which creates a slackness in that length of paper extending from the corrugated rolls to the shaft 134. The belt 138 is rather slack on the pulley 136 and in the pulley groove 137, so slack, in fact, that there is a slippage between the belt 138 and the pulleys so that the shaft 134 constantly tends to pull the strip of paper 98 from the feed rolls 128 and 114. As soon as such slack is created in the length of paper 98 from the feed rolls to the shaft 134, the belt 138 will rotate the shaft 134 sufficient to take up such slack.

The sequence of operations above described may take place indefinitely, the paper 98 being moved step by step across the path of the plunger 21 to present a new uncut surface to the die 75 and the extent of each step by step movement is sufficient for this purpose and is short enough to insure that practically every available bit of paper is used.

While I have necessarily shown and described the preferred embodiment of my invention somewhat in detail, it is to be understood that I may vary the size, shape, and arrangement of parts within wide limits without departing from the spirit of the invention.

Various modifications within the scope of the invention and the appended claims will readily occur to those skilled in the art. Thus I may reverse the position of the cutters and mount the same on the movable plunger or other pressure applying means; the plunger may be moved either from above downwardly, or from below upwardly; the entire cutting anvil, while preferably in a single unit, including the cutting instrumentalities, stripper plates, cutting and guiding masks, may, of course, be separated into co-operating or interchangeably locked parts. Also while it is an important feature of the present machine to utilize relatively heavy paper through which to perform the cutting action, it is, of course, entirely feasible to employ a soft material, such even as a sheet of brass, composition, rubber or the like suitable cutting surface. Paper is preferred because it does not dull the cutting edges of the die. It will also be appreciated that my machine in addition to the capacity for performing the highly difficult and involved cutting out actions on closed shoe uppers, as herein illustrated and explained, is also capable of performing the more simple cutting out actions, such for example as tip perforating, toe ornamentation, etc., and in fact the cutting devices could be fitted to perform both cutting out and tip perforating simultaneously, as will be readily understood. By means of the construction and arrangement of the cutting anvil and the clearance or space allowing for concealing, protecting and guarding the shoe upper at any point below the plane of the cutting operation by recesses in the top, at the side or underneath the anvil, a substantially universal cutting, perforating, and ornamenting machine, particularly suitable for advantageous use in shoe manufacture, is produced, giving a machine of this type suitable for performing all these intricate operations on shoe uppers or parts of the same, which heretofore required separate machines or difficult hand operations. The feature of my work support which is capable of use both in operating upon flat or sheet material, the combination of materials such as is presented in a shoe upper of joined parts, lining, etc., wherein clearance and space is provided around and about the support, preferably below the line of the cutting operation, is of the greatest importance. Particularly is this feature important when operating upon a shoe upper, whether flat, a fitted or partly fitted upper, or a completely fitted and closed upper. That part of the work which is not being operated upon to constitute the cut-out portion, may thus be protected, guarded and held within the recesses, spaces, clearance or room about, under, or partly under the work support, which capacity is one of the important characteristic novelties of my present invention. This feature of the protecting recesses, space and clearance, distinguishes my present invention from all former tip perforating or the like machines, wherein a flat bed or support was utilized, but without any capacity for operating upon any work except flat pieces. As above noted, my machine will do all the operations heretofore performed upon flat bed machines, and in addition thereto, will operate advantageously upon articles having a curved contour such as is presented in shoe uppers. For this latter work I may apply a fitted, partly fitted, or completely fitted and closed upper on the work support, positioned either as shown in the drawings or in reverse direction, and indeed may position the work supporting slide either as shown or in reverse position.

Having thus described my invention, what I claim as new and desire to secure by Letters Patent of the United States, is:—

1. A machine of the kind described, having pressure applying means, ornamenting means mounted independent of said pressure applying means and co-operating therewith, means for supporting the ornamenting means, said ornamenting means and said supporting means constructed and arranged to support in a substantially flat position a portion of a shoe upper made up of two or more pieces of flat material attached together such that the combined pieces forming the shoe upper cannot be placed in a flat position, and to allow other portions of the upper to extend about its sides without buckling the portion of the upper to be ornamented.

2. A machine of the kind described, having pressure applying means, ornamenting means, movable means for supporting the ornamenting means, said ornamenting means and supporting means constructed and arranged to support flatwise a portion of a shoe upper made up of two or more pieces of flat material attached in such a manner that the combined pieces cannot be placed flatwise, and to allow other portions of the upper to extend about its side without buckling the portion of the upper to be ornamented.

3. A machine of the kind described, having work supporting means, pressure applying means, and shoe ornamenting means mounted independent of said pressure applying means and cooperating therewith, said machine constructed and arranged to provide a substantial work receiving space extending below the plane of the ornamenting action and along lateral sides of the work supporting means and ornamenting means.

4. A machine for cutting out open work patterns in shoe uppers, having a support for work, pressure applying means, and cutting devices having upstanding cutting members for cutting out designs in predetermined portions of the work mounted independent of the pressure applying means and cooperating therewith, said machine constructed and arranged to provide a substantial work receiving recess disaligned from the plane of the cutting action.

5. The combination for use in a machine for cutting designs in shoe upper material having clutch locking mechanism, comprising a cutting die, a movable support for the die, and means for releasing the clutch locking mechanism by the movement of the support.

6. The combination for use in a machine for cutting designs in shoe upper material having clutch locking mechanism, comprising a cutting die, a movable support for the die, and a clamping mask to hold the upper material under tension, and means for releasing the clutch locking mechanism by the movement of the support.

7. The combination for use in a machine for cutting designs in shoe uppers having clutch locking mechanism, comprising a cutting die, a movable support for the die, said support and die constructed and arranged with a flat-wise top portion to support in a substantially flat position a portion of an upper to be cut and with lateral sides about which the upper is draped, preventing buckling of the shoe upper while the design is cut therein, and means for releasing the clutch locking mechanism by the movement of the support.

8. The combination for use in a machine for cutting designs in shoe uppers having clutch locking mechanism, comprising a cutting die, a movable support for the die, means associated with said die and support to act as a gauge for the positioning of the material with relation to the die, and means for releasing the clutch locking mechanism by the movement of the die and support.

9. A machine for forming openwork in shoe uppers, having cutting out devices, a support for said devices, means to act as a guide for the positioning of a finished portion of the upper relatively to the cutting out devices, and means on the support for holding the upper thus positioned, one of the sides of said support constructed with an upper receiving opening.

10. A machine for cutting out predetermined portions of a shoe upper, having, in combination, a plunger, a work support, a cutting die mounted independent of the plunger, and means co-operating with the work support and with work supported thereon to act as a gauge in positioning substantially flatwise with relation to the cutting die, that portion of the work to be cut, said support having recesses to receive a portion of the work in other than a flat position.

11. A machine for cutting out predetermined portions of a shoe upper, having, in combination, an auxiliary support, a work support movable into and out of engagement with said auxiliary support, a cutting die positioned on the movable work support, and means co-operating with the movable work support and with work supported thereon to act as a guide in positioning the work with relation to the cutting die.

12. A machine of the kind described, comprising work supporting means, cutting devices having cutting edges, pressure applying means, and backing material toward which the cutting edges are directed, said machine providing, for a portion of the work, substantial work receiving spaces disaligned from the plane of operation.

13. A machine of the kind described, comprising work supporting means, cutting devices having cutting edges, pressure applying means, backing material toward which the cutting edges are directed, and means to impart movement to the backing material, said machine providing, for a portion of the work, substantial work receiving spaces disaligned from the plane of operation.

14. A machine for cutting out openwork patterns in shoe uppers, having, in combination, a pressing member, a work support, a cutting die on said support, said die and support constructed to support a portion of an upper in a substantially flat position and to be moved into and out of the path of movement of said pressing member, means acting as a guide in positioning the work with relation to the cutting die on the support, and backing material interposed between said pressing member and cutting die, said machine having recesses to receive a portion of the upper in other than flat position.

15. A machine for ornamenting shoe upper material, comprising a movable support for shoe upper material, cutting means mounted on said support, a driven element, pressure applying means connected with said driven element, a driving element for said driven element, a safety clutch mechanism provided with means for preventing actuation of the driven element by the driving element until said work support is in operating position.

16. A machine for ornamenting shoe upper material, comprising a movable support for shoe upper material, cutting means mounted on said support, clutch locking means, a driven element, pressure applying means connected with said driven element, a driving element for said driven element, safety clutch mechanism preventing actuation of the driven element by the driving element until released by the clutch locking means, and means associated with the support to release the clutch locking means as it reaches the limit of its movement to operating position.

17. A machine for ornamenting shoe upper material, comprising a movable support for shoe upper material, cutting means mounted on said support, a driven element, pressure applying means affected by said movable support in its driving element for said driven element, clutch mechanism for establishing a driving connection between said driving and driven elements and means effected by said movable support in its movement for inhibiting the operation of said clutch mechanism.

18. In a machine for forming openwork in shoe uppers, the combination with a bed, a pressing member, and a cutting out tool, of a work supporting member provided with a top face upon which one of the quarters of a made upper is positioned flatwise for the cutting out operation, and with an end face having a depression therein in which the opposite quarter of the made upper is positioned during the cutting out operation, said pressing and work supporting members being constrained to move relatively in two directions normal to each other.

19. In a machine for forming openwork in shoe uppers, the combination with a bed and a pressing member, a cutting out tool supported other than by the pressing member, of a work supporting member on said bed provided with a work supporting surface elevated above the bed and constructed to provide spaces below the elevated work supporting surface for at least one hand holding the work on the work supporting member.

20. A machine for forming openwork in shoe uppers, and in which the uppers are supported in such a manner that uncut portions of the upper are in other than flat position, including a driven element, a pressing member connected therewith, a driving element, cutting devices, movable work supporting means so shaped and arranged relatively to other parts of the machine that recesses are provided to receive uncut portions of the upper disaligned from the plane of engagement of said cutting devices, and clutch means adapted to engage the driving and driven elements, and means for normally preventing actuation of the clutch.

21. A machine for cutting openwork patterns in limited portions of shoe uppers which have been stitched to form a ring-like piece of work comprising a frame having a base, a presser member operating in said frame toward and away from the base, a die having upstanding cutting edges forming the pattern to be cut in the upper, the width of said die being limited to a dimension enabling it to be inserted within the ring-like structure of the closed upper, and a member for supporting said die upon the base and having a width substantially like that of the die arranged to elevate said die above the base sufficiently to allow that portion of the upper to be cut to be placed in a flattened condition upon the die while the remainder of the ring-like structure of the upper encircles the sides and end of the supporting member, said supporting member being constructed to extend from the cutting die to the base of the machine in line with the path of movement of the presser member, thereby to resist the action of the presser member and to insure the rigidity of the support for the die.

22. For use in a machine for cutting designs in shoe upper material having a support, the combination of a cutting die, a base with the die mounted upon the upper portion thereof and having a locating pin and clamping stud extending from the lower portion thereof, said pin formed to project into a hole and said stud into an opening, both the hole and the opening being provided in the support, said pin and stud constructed and arranged to locate and allow the base and die to be clamped on the elevated support, irrespective of the width of the die.

23. For use in a machine for cutting designs in shoe upper material, in which an elevated support is mounted upon the platen of the machine, the combination of a cutting die, a base upon which said die is mounted, locating and clamping means attached to said base and constructed to locate and allow the cutting die and the base to be clamped on the elevated support, irrespective of the width of the die.

24. A perforating machine comprising a frame having fixed platen guides; a reciprocating platen movable in said guides; a fixed bed arranged in a plane substantially at right angles with the path of the platen, and extending under the latter, and an anvil manually movable on the bed and provided with punches adapted to cooperate with the platen, the bed and anvil being provided with complemental guide elements, adapted and arranged to guide the anvil in a path parallel with the plane of the bed, and permit anvils of different widths to be used interchangeably with the bed, without change or adaptation of the guide elements, the frame, the bed, and the anvil being formed and arranged to provide spaces at the opposite sides of the anvil, and below the upper surface thereof for hands holding the work.

25. A perforating machine comprising a frame having fixed platen guides; a reciprocating platen movable in said guides; a fixed bed arranged in a plane substantially at right angles with the path of the platen, and extending under the latter, and an anvil manually movable on the bed and provided with punches adapted to cooperate with the platen, the bed and anvil being provided with complemental guide elements, adapted and arranged to guide the anvil in a path parallel with the plane of the bed, and permit anvils of different widths to be used interchangeably with the bed, without change or adaptation of the guide elements, the frame, the bed, and the anvil being formed and arranged to provide spaces at the opposite sides of the anvil, and below the upper surface thereof for hands holding the work, the bed and the base of the anvil being each extended laterally in opposite directions from said guiding element.

26. A machine for cutting openwork patterns in shoe uppers, comprising a base, lateral supports extending upwardly from said base, a presser member guided for up and down movement between said supports, means for operating said presser member constructed and arranged so that there is a substantial space between the lowermost limit of movement of the presser member and the base of the machine sufficient to allow the insertion of the operator's hands, a cutting die, and a narrow central support for elevating said die to a position where it will cooperate with the presser member, said die being slidably mounted with respect to the base of the machine to allow it to be moved forward from beneath the presser member to a position to allow the placing of work thereon by the operator and the return of the die and the piece of work to cutting position beneath the presser member where the lateral edges of the work may be held by the operator without danger of crushing the operator's hands.

27. In combination, a cutting die having cutting edges defining a pattern to be cut, a cooperating movable presser member, and a pivoted holddown plate having an opening larger than the pattern to be cut, and arranged to hold a piece of work in position with respect to the die, said holddown plate having means extending to a position out of the range of movement of the presser member whereby an operator may, with safety, depress the holddown against the work.

28. In a die press, the combination with a bed, a pressing member and a cutting-out tool, of a work supporting member constructed to support flatwise one of the quarters of a made upper for the cutting-out operation and to receive the opposite quarters out of the way without buckling the quarter operated upon, said pressing and work supporting members being relatively movable in two directions normal to each other.

29. In a die press, the combination with a bed, a pressing member, and a cutting-out tool, of a work supporting member provided with a top face upon which one of the quarters of a made upper is positioned flatwise for the cutting-out operation and with an end face having a depression therein in which the opposite quarter of the made upper is positioned during the cutting-out operation, said pressing and work supporting members being relatively movable in two directions normal to each other.

30. In a die press the combination with a bed, a pressing member, and a cutting-out tool mounted independent of the pressing member, of a work supporting member provided with a body portion having a rectangular top face, said face having a front edge extending substantially the width of the face and overhanging the body portion of the work supporting member, said overhanging front edge being interposed between the quarters of a made upper during the cutting-out operation.

31. In a die press, the combination with a bed, a pressing member, and a cutting-out tool mounted independent of the pressing member, of a work-supporting member provided with a body portion having a rectangular top face, an end face having a deep depression therein, and side faces having shallower depressions therein.

32. In a die press, the combination with a bed, a pressing member and a cutting-out tool supported other than by the pressing member, of a work supporting member, on said bed, adapted to fit inside of a made shoe upper provided with a work supporting surface, elevated above the bed, upon which the portion of the upper to be operated upon is positioned flatwise, and provided with a depression below the elevated surface in which another portion of the upper may be positioned by at least one hand holding the work on the work support.

33. In a die press, the combination with a bed, a pressing member, a cutting-out tool supported other than by the pressing member, of a work supporting member on said bed, adapted to fit inside of a made shoe upper, provided with a work supporting surface, elevated above the bed, upon which the portion of the made upper to be operated upon is positioned flatwise and also with a deep depression in its front end face and shallower depressions in its side faces below the elevated surface in which depressions other portions of the upper may be positioned by at least one hand holding the work on the work support.

34. A machine for cutting openwork designs in shoe uppers, according to a process in which said uppers are made up of two or more pieces of flat material attached together with a lining such that the combined pieces cannot be placed in flat position, and without the desired design being cut in said work, comprising a bed, pressure applying means, a work support, a cutting die mounted thereon, said support and die forming an elevated structure supporting in a substantially flat position the portion of the shoe upper to be cut and providing a space for a portion of the upper disaligned from the plane of the cutting action, and not to be cut, thus preventing the buckling of the portion of the upper to be cut, during the cutting operation whereby the desired design is cut through upper and lining in one operation.

35. A machine for cutting openwork designs in shoe uppers, according to a process in which said uppers are made up of two or more pieces of flat material attached together with a lining such that the combined pieces cannot be placed in flat position, and without the desired design being cut in said work, comprising a bed, pressure applying means, a work support, a cutting die mounted thereon, said support and die forming an elevated structure supporting in a substantially flat position the portion of the shoe upper to be cut and providing a space for a portion of the upper disaligned from the plane of the cutting action, and not to be cut, thus preventing the buckling of the portion of the upper to be cut, during the cutting operation whereby the desired design is cut through upper and lining in one operation, said support and die being movable from a work placing to work cutting position.

36. A method of manufacturing shoes which comprises securing upper blanks and lining therefor together to form a non-planiform work piece having the lining thereof attached and in place, supporting said work piece about a cutting die with a portion thereof substantially flatwise, said portion being designed to receive decorative cut outs, and draping the remainder of said work piece about the sides of the die without buckling the portion laid flatwise, and then effecting a penetration of the work piece by the die by means of a press head and thereafter assembling said work piece together with other parts of the shoe.

37. A method of manufacturing shoes which comprises securing upper blanks and lining together to form a non-planiform work piece having the lining thereof attached and in place, supporting said work piece about a cutting die with a portion thereof substantially flatwise, said portion being designed to receive decorative cut outs, and draping the remainder of said work piece about the sides of the die without buckling the portion laid flatwise, then moving the assembled die and work piece into a position for press operation thereon, then striking the assembled parts a blow to effect a penetration of the work by the die, and then assembling the said work piece together with other parts of the shoe.

38. A method of manufacturing shoes which comprises securing upper blanks and lining together to form a non-planiform work piece having the lining thereof attached and in place, supporting said work piece about a cutting die with a portion thereof substantially flatwise, said portion being designed to receive decorative cut outs, and draping the remainder of said work piece about the sides of the die without buckling the portion laid flatwise, gauging the position of the said work piece with reference to the die, then moving the assembled die and work piece into a position for press operation thereon, then striking the assembled parts a blow to effect a penetration of the work by the die, and then assembling the said work piece together with other parts of the shoe.

39. A method for manufacturing shoes which comprises securing upper blanks and lining together to form a non-planiform work piece having the lining thereof attached and in place, supporting said work piece with a portion thereof flatwise, said portion designed to receive cut outs, and draping the remainder of said work piece about the sides of the support, said support having a previously determined relation to the die, locating the said work piece upon said support with reference to the die, and thereupon striking the assembled and relatively located parts a blow with a press head to effect a penetration of the work piece by the die.

40. A method of manufacturing shoes which comprises forming a lined, fitted upper, closing same into a ring-like form, supporting same with a portion thereof held flatwise in proximity to an ornamenting medium, and with the remainder thereof draped and positioned to avoid buckling of the flatwise portion, accurately positioning said flatwise portion with respect to said ornamenting medium, whereby said portion may be ornamented, and thereafter causing said ornamenting medium to operate upon the flatwise portion, by applying a blow thereto as a machine operation.

BENJAMIN W. FREEMAN.

CERTIFICATE OF CORRECTION.

Reissue No. 20,203. December 8, 1936.

BENJAMIN W. FREEMAN.

It is hereby certified that error appears in the printed specification of the above numbered patent requiring correction as follows: Page 10, first column, line 17, claim 17, for the words "affected by said movable support in its" read connected with said driven element, a; and that the said Letters Patent should be read with this correction therein that the same may conform to the record of the case in the Patent Office.

Signed and sealed this 26th day of January, A. D. 1937.

Henry Van Arsdale (Seal) Acting Commissioner of Patents.